United States Patent
Klatsky (10) Patent No.: US 9,197,754 B2
(45) Date of Patent: Nov. 24, 2015

(54) PRECONFIGURED SENDER COMMUNICATION

(71) Applicant: Comcast Cable Communications, LLC, Philadelphia, PA (US)

(72) Inventor: Carl Klatsky, Yardley, PA (US)

(73) Assignee: Comcast Cable Communications, LLC., Philadelphia, PA (US)

( * ) Notice: Subject to any disclaimer, the term of this patent is extended or adjusted under 35 U.S.C. 154(b) by 0 days.

(21) Appl. No.: 13/799,567

(22) Filed: Mar. 13, 2013

(65) Prior Publication Data

US 2014/0270120 A1 Sep. 18, 2014

(51) Int. Cl.
*H04M 1/64* (2006.01)
*H04M 3/533* (2006.01)
*H04M 3/42* (2006.01)

(52) U.S. Cl.
CPC ...... *H04M 3/53366* (2013.01); *H04M 3/42153* (2013.01); *H04M 2203/654* (2013.01)

(58) Field of Classification Search
CPC ............ H04M 1/72552; H04M 3/42042; H04M 1/64; H04M 3/53383; H04M 3/537; H04M 2203/2072; H04M 2203/651; H04M 1/6505; H04M 1/7255; H04M 2250/74; H04M 3/533; H04M 3/53366; H04M 1/656; H04M 3/436; H04M 3/54; H04M 2203/2011; H04M 3/4288; H04M 15/06; H04M 3/42382; H04M 5/53383; H04M 9/08; H04M 11/062; H04M 3/42153; H04M 1/6033; H04M 1/32411; H04M 1/576; H04M 1/57; H04M 3/42229; H04M 3/428; H04M 3/5307; H04M 3/493; H04L 63/123; H04L 65/1096; H04L 12/58; H04L 12/5885; H04L 12/587; H04Q 2213/13103

USPC ........ 379/93.24, 88.04, 88.11, 88.22, 100.08, 379/88.18, 88.12, 211.02, 93.01, 201.12, 379/88.01, 142.04, 142.15, 201.02, 215.01, 379/88.13, 88.16, 93.35; 455/413, 445

See application file for complete search history.

(56) References Cited

U.S. PATENT DOCUMENTS

| | | | |
|---|---|---|---|
| 5,604,790 A | 2/1997 | Grimes | |
| 5,999,599 A | 12/1999 | Shaffer et al. | |
| 6,950,504 B1* | 9/2005 | Marx et al. | 379/88.19 |
| 7,177,811 B1* | 2/2007 | Ostermann et al. | 704/260 |
| 8,290,525 B2 | 10/2012 | Gilson | |
| 2002/0073142 A1 | 6/2002 | Moran | |
| 2002/0159572 A1* | 10/2002 | Fostick | 379/88.14 |
| 2009/0238353 A1 | 9/2009 | Mani | |
| 2010/0067669 A1* | 3/2010 | Webb et al. | 379/88.17 |
| 2010/0210249 A1* | 8/2010 | Gisby | 455/414.1 |
| 2013/0108032 A1* | 5/2013 | Shaw | 379/88.14 |
| 2014/0099922 A1* | 4/2014 | Cazanas et al. | 455/411 |

* cited by examiner

Primary Examiner — Akelaw Teshale
(74) Attorney, Agent, or Firm — Banner & Witcoff, Ltd.

(57) ABSTRACT

Methods and systems are described for allowing a calling party to provide a provisional message for a called party. In one aspect, when the calling party places a call to the called party and does not receive an answer, the calling party may choose to have the provisional message delivered.

20 Claims, 5 Drawing Sheets

PRECONFIGURED SENDER COMMUNICATION

BACKGROUND

When attempting to establish a call or other type of interactive voice communication, the calling party may have a specific message to provide to the called party. In such a circumstance, it is often useful to get the correct message to the called party. Typically, mail systems have been used for this purpose. In certain situations, however, voice mail may not be a first choice. For example, a calling party may want to speak with a called party directly, and if refused or unable to connect, may be unprepared to leave a voice mail. Thus, there's a need to be able to leave a preconfigured provisional message when an event such as a failed call attempt occurs.

SUMMARY

This Summary is provided to introduce a selection of concepts in a simplified form that are further described below in the Detailed Description. This Summary is not intended to identify key features or essential features.

In some embodiments, a system may receive, from a calling party device, one or more voice, textual, and/or video messages or other types of provisional messages for a mailbox system of a called party device. An instruction also may be received to enable sending the voice, textual, and/or video voice message to the mail system of the called party device. In one aspect, a request to complete a voice call session with the called party device may be sent. If a communication containing an indication of a refusal or any other type of unavailability of the requested voice call session and an indication of call forwarding to the mail system of the called party device is received, the preconfigured voice, textual, and/or video message may be sent to a mail system of the called party device responsive to the communication containing the indication of the unavailability of the requested voice call session and the indication of call forwarding to the mail system of the called party device. The voice, textual, and/or video message that is sent to the mail system of the called party device may include an audio signal, e.g., a voice mail message of the calling party, to accompany the voice, textual, and/or video message.

In another embodiment, a calling party device may send a voice, textual, and/or video message or other types of provisional message for a mail system of a called party device. The voice, textual, and/or video message may be for a group of called party devices. A communication requesting a voice call session with the called party device may be sent. An instruction to enable the server to send the voice, textual, and/or video message to the mail system of the called party device may be sent. In some embodiments, such an instruction may be sent prior to the request for the voice call session. In other embodiments, such an instruction may be sent in response to a communication from the mail system of the called party containing an indication of a refusal or any other type of unavailability of the requested voice call session and an indication of call forwarding to the mail system of the called party device. An audio signal may accompany the voice, textual, and/or video message.

The summary here is not an exhaustive listing of the novel features described herein, and are not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying Figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
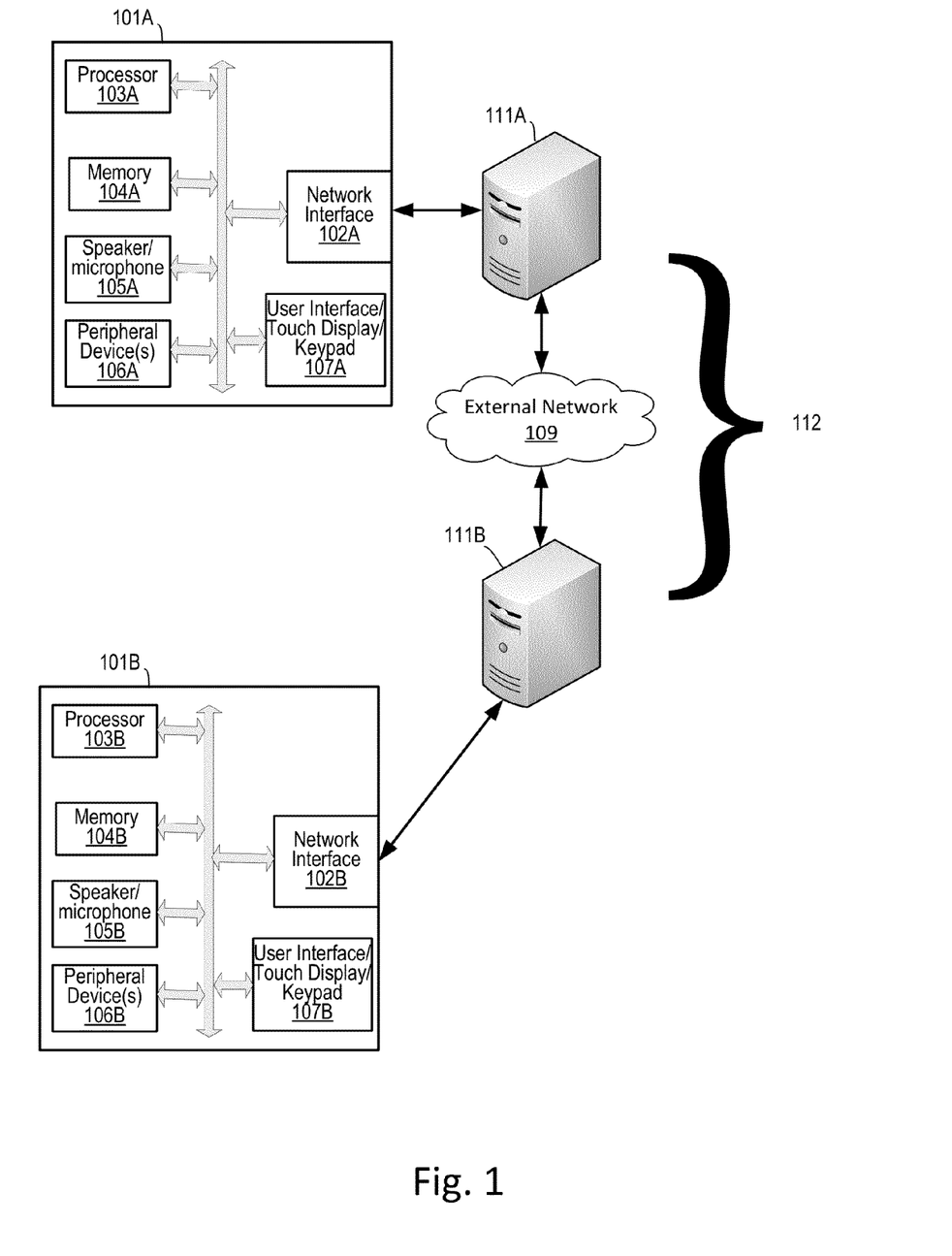
FIG. 1 illustrates an example communication network on which various features described herein may be used.

FIG. 1 illustrates an example communication network on which various features described herein may be used. The system of FIG. 1 may be variously configured to include any wire or wireless telecommunication network 112. In one exemplary embodiment, a first communication terminal 101A (e.g., a wireless and/or wireless phone, table, laptop, watch, and/or other similar device) and/or a second communication terminal 101B (e.g., a wireless and/or wireless phone, table, laptop, computer, watch, and/or other similar device) may be variously configured such as to communicate with each other either directly and/or through one or more other communication systems such as telecommunication network 112. In one exemplary embodiment, the telecommunication network 112 may include one or more systems such as a front office, local equipment company (LEC), cable headend, router, wireless communication network, server, local exchange, PABX, and/or other network interface device(s) 111A, 111B. The one or more network interface device(s) 111A, 111B may themselves be coupled together using any suitable network such as the Internet, internet, intranet, public device network (e.g., PSTN), private device network, plain old device service (POTS), and/or other suitable wire and/or wireless network(s) 109. The network interface device(s) 111A, 111B and/or network(s) 109 in some exemplary embodiments may be aggregated together to form telecommunication network 112. Network interface devices 111A and 111B may be implemented in various ways including using one or more processor(s), memory(ies) and one or more network communication interfaces, with the processors being configured to execute instructions (hardwired and/or stored as executable code on any appropriate medium) to carry out the operations of the network interface devices as described herein. Network interface devices 111A and 111B may include respective mail systems for communication terminal(s) 101A and 101B, and/or mail systems may be integrated directly into communication terminal(s) 101A and/or 101B. Network interface device 111A and/or network interface device 111B may be included within a cloud-based network. Network(s) 109 may be a cloud-based network with various storage components.

In the example of FIG. 1, the telecommunication network may be variously configured such as wide area wireless access network (e.g., including but are not limited to cellular device networks, third generation (3G) mobile networking, telecommunication networks, EDGE (Enhanced Data rate for GSM Evolution) networks, and EVDO (EVolution Data Optimized) networks, etc.). Accordingly, network interfaces 102A and/or 102B may include a transceiver configured for direct communication with the telecommunication network 112. The communication terminals may include processor(s) 103A, 103B, memories (e.g., RAM, ROM, FLASH, fixed and/or removable storage drives) 104A, 104B, user interfaces (e.g., touch screens, keypads, voice recognition, etc.) 107A, 107B, audio devices (e.g., speaker(s)/microphone(s)) 105A, 105B, processor(s) (e.g., logic, software, RISC processor, microprocessors, general purpose processors, special purpose processors, codecs, audio codecs, video codecs, etc.) 103A, 103B, and/or other suitable peripheral devices (e.g., cameras, audio outputs, GPS devices) 106A, 106B. Any of the devices and operations associated with communication terminals 101A, 101B may be physically embodied in the form of instructions (e.g., executable code and/or hard-wired logic) associated with and/or executed by processor(s) (103A, 103B) and/or memory (104A, 104B).

In embodiments where each of communication terminals 101A and 101B communicates directly with a separate telecommunication network, terminals 101A and 101B need not directly communicate with the same type of network. For example, terminal 101A could communicate directly with a 3G network and terminal 101B could communicate directly with an EVDO network. In some embodiments, terminals 101A and 101B may each communicate directly with each other and/or a common access network.

Although certain embodiments include two communication terminals that communicate directly with one or more wide area wireless access networks, this is only one example. In other embodiments, communication terminals 101A and 101B communicate directly with a different type of access network, and are themselves different types of communication terminals. For example, terminal 101A and/or terminal 101B could be a computer, a set top terminal, or some other type of communication device that communicates directly with telecommunication network that is a wired access network. Examples of wired access networks include but are not limited to a hybrid fiber coaxial (HFC) network used to deliver telephony, data and other services to a premises over a coaxial drop, a Fiber to the Home (FTTH) network used to deliver telephony, data and other services over a fiber optic link that terminates in a premises, a Digital Subscriber Device call signaling message (DSL) network delivering telephony, data and other services over a twisted pair conductor that terminates in a premises, etc. In embodiments where communication terminal 101A communicates directly with a wired access network, network interface 102A may include one or more appropriate interface components (e.g., a cable modem, an optical network terminal, a DSL modem) for communication over the access network medium and may be configured (via instructions stored in processor 103A and/or memory 104A, for example) to communicate with the telecommunication network using the appropriate protocols. In embodiments where terminal 101B communicates directly with a telecommunication network 112, network interface 102B similarly may include the appropriate components for communication over the telecommunication network and utilize the appropriate protocols.

In still other embodiments, one or more of communication terminals 101A and 101B may communicate over a telecommunication network configured as a local wireless network link with an in-premises gateway, a femtocell or other device. In these embodiments, the gateway, femtocell or other device may then relay communications from and to the terminal over an access network link. In some embodiments, for example, communication terminal 101A, 101B may be a Digital Enhanced Cordless Telephone (DECT) handset or some other type of local wireless network device. In such embodiments, hardware interface 102A may include a short-range wireless transceiver for communication with a corresponding transceiver in a gateway (or other relaying device) and may be configured (via instructions stored in processor 103A and/or memory 104A, for example to communicate using the appropriate local wireless network protocols. Example types of local wireless networks that may be included as part of telecommunication network 112 include but are not limited to DECT networks, WiFi networks according to IEEE 802.11, Cordless Advanced Technology—Internet and Quality (CAT-iq) networks, etc. In embodiments where terminal 101B communicates directly over a local wireless network link, hardware interface 102B similarly includes the appropriate components for communication over that local wireless network and is configured to communicate using the appropriate local wireless network protocols.

In still other embodiments, one or both of communication terminals 101A and 101B may communicate over a telecommunication network configured as a wired local network link with a local gateway, router or other element, and with that other element then relaying communications from and to the terminal over an access network link. Examples of local wired networks include Ethernet networks, Multimedia Over Coax Alliance (MOCA) networks, Digital Living Network Alliance (DLNA) networks, etc. In such embodiments, the network interface 102A, 102B may include the appropriate hardware (e.g., an Ethernet card, a MOCA chipset, a DLNA chipset) for communication over the telecommunication network 112 when configured to include a local network medium. The communication terminal 101A, 101B may be further configured (e.g., by instructions stored in the processor and/or memory) to communicate using the appropriate local network protocols.

Again referring to FIG. 1, the network interface 102A, 102B may be configured to receive and demodulate/modulate and transmit communication signals to and/or from telecommunication network 112. Processor(s) 103A, 103B may be configured to execute instructions so as to perform various operations as described herein and to control operation of other components associated with the respective communication terminal(s) 101A, 101B. Instructions may be stored in memory 104A as executable code and/or as hard wired logic within processor 103A. Memory 104A may also store data sent or received by terminal 101A and/or other data used in operation of terminal 101A. Processor(s) 103A, 103B may also be configured to perform one or more types of CODEC (coder/decoder) operations to convert data to audio, and/or audio to data associated with speaker/microphone 105A, 105B. Processor(s) 103A, 103B may also be configured to input and output data e.g., video data and/or touch data (including text and/or video messages) to and from a user interface 107A, B.

Terminals 101A and 101B may be configurable to establish a voice call session with one another. The voice call session may include full duplex communication sessions, half-duplex communications, "Push-to-Talk" communication sessions, and other types of sessions in which two users can exchange communications. Each of communication terminals 101A and 101B may also be configured to send and receive voice, textual, and/or video messages or other types of provisional messages. In some circumstances, a user of communication terminal 101A may seek to establish a session with communication terminal 101B when the user of communication terminal 101B does not wish (or is not able) to conduct a voice conversation. Although the communication terminal 101B user could simply ignore a call session request from communication terminal 101A (e.g., not answer the incoming call request), communication terminal 101B could allow that incoming call request to be directed to a mail system. Accordingly, communication terminals 101A and 101B are also configured so that a user of one communication terminal can specify that another communication terminal, requesting a voice call session, should be requested or instructed to instead be sent to a mail system of the user, the called party.

One or more aspects of the disclosure may be embodied in a computer-usable data and/or computer-executable instructions, such as in one or more program modules (e.g., in memory 104A, 104B), executed by one or more computers or other devices (e.g., processor(s) 103A, 103B. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 2:
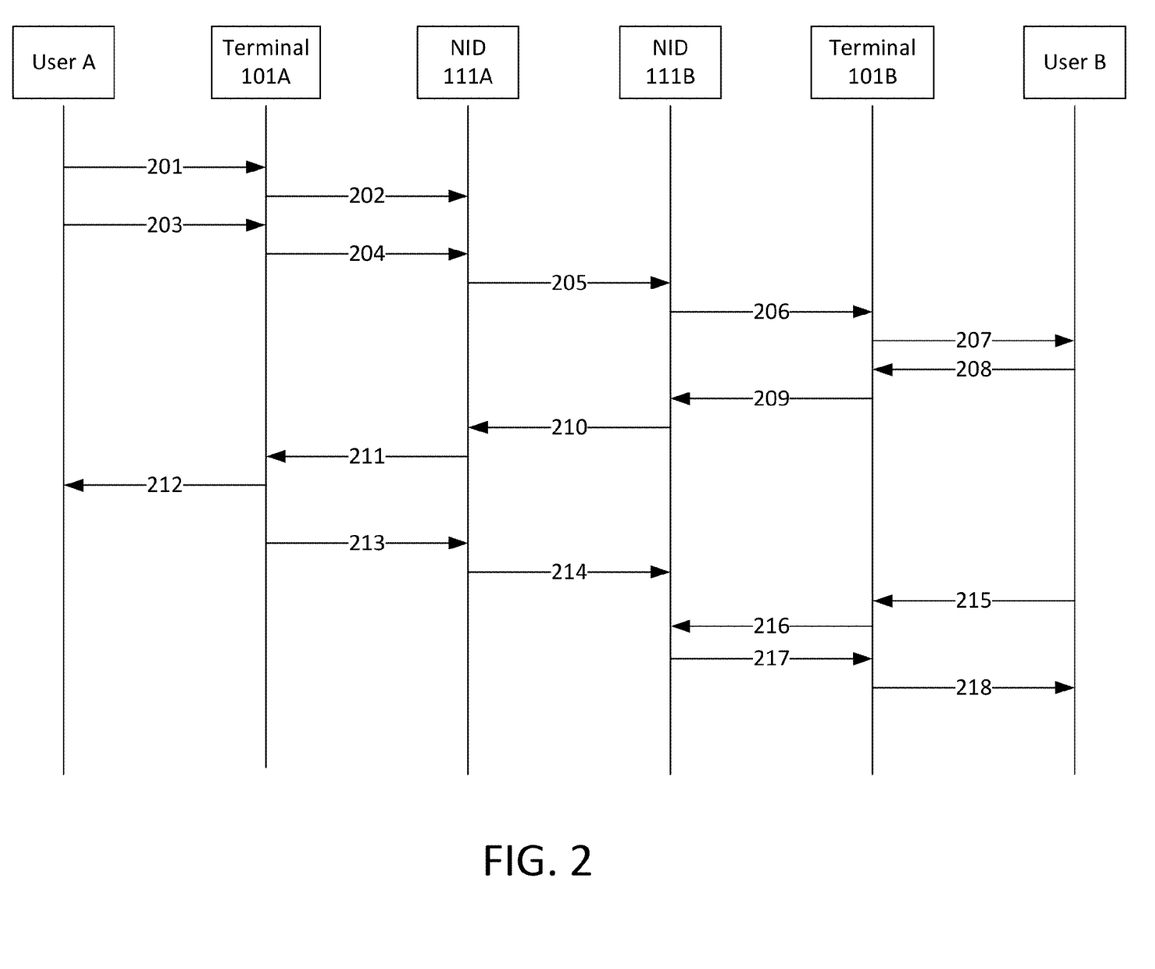
FIGS. 2-3 illustrate example communication diagrams showing messaging according to at least some embodiments.
Figure 3:
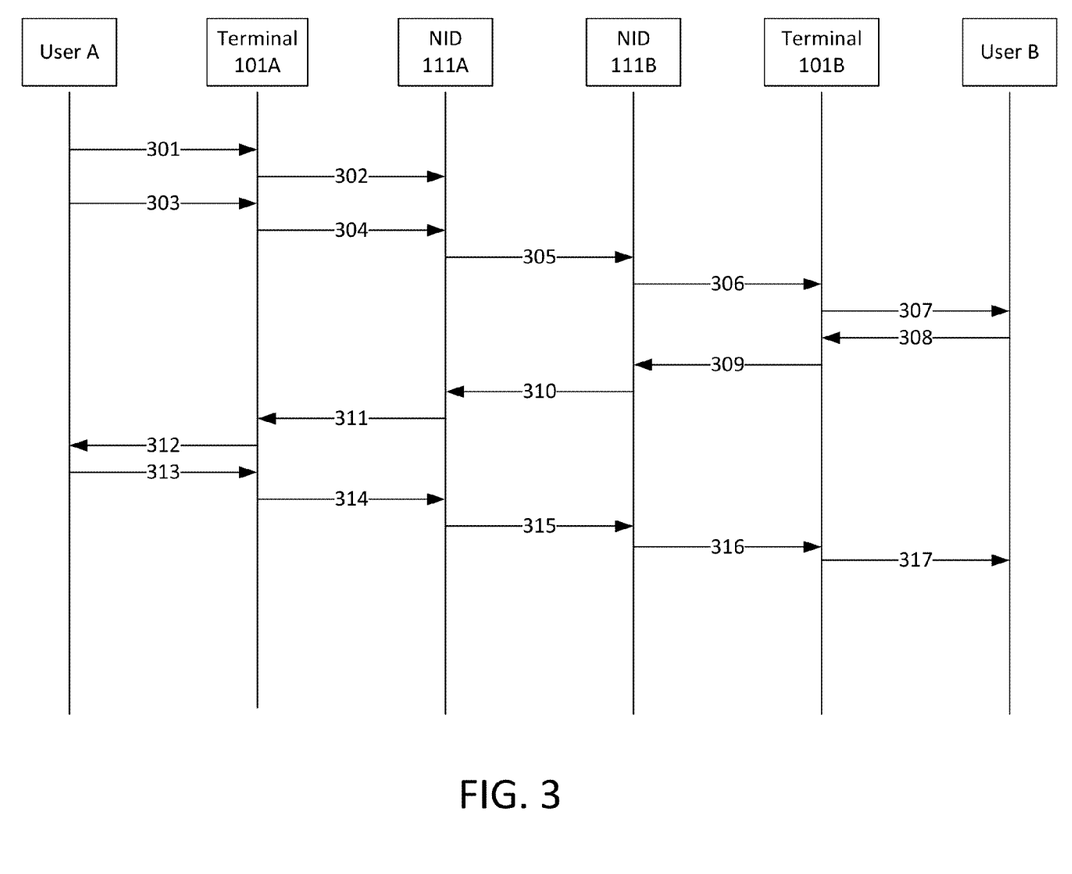

FIGS. 2 and 3 represent example communication flow diagrams showing audio, textual and/or video messaging according to at least some embodiments. In exemplary embodiments, the communication flow diagrams represent one or more ENUM and/or call control messages sent across an IP network. In the embodiments of FIGS. 2 and 3, each of communication terminals 101A and 101B may support a video and/or textual message to voice mail feature. The video and/or textual message to voice mail feature permits a communication terminal attempting to initiate a voice call session (e.g., a calling party), to provide a video and/or textual message as part of a voice mail input if the requested session is not established. In the example of FIG. 2, user A inputs a textual and/or video message for a mail system (e.g., a voice mailbox, electronic mail, social media space, etc.) of a called party device at device call signaling message 201. Device call signaling message 201 occurs prior to initiation of a request for a voice call session between user A and user B. At device call signaling message 201, user A input the voice, textual, and/or video message that is pre-configured for sending to the called party. At device call signaling message 202, communication terminal 101A for user A sends the voice, textual, and/or video message to the network interface device 111A for user A where it may be stored. Concurrent with the voice, textual, and/or video message input at device call signaling message 201 or thereafter, user A may input an instruction to enable network interface device 111A to send the voice, textual, and/or video message, with an audio signal (e.g., a voice message from user A) or alone, to a mail system of a called party if a voice call session with the called party is refused. Similarly, concurrent with the voice, textual, and/or video message sent to the network interface device 111A at device call signaling message 203 or thereafter, communication terminal 101A may send an instruction to enable network interface device 111A to send the voice, textual, and/or video message, with an audio and/or video signal (e.g., a voice message from user A) or alone, to a mail system of the called party if a voice call session with the called party is refused. Alternatively, such features may be automatically enabled.

By call signaling message 203, user A of communication terminal 101A may initiate a request for voice call session with user B. In the embodiment of FIG. 2, user A may do so by inputting an identifier (e.g., a device number) associated with communication terminal 101B and an instruction to begin the voice call session setup process (e.g., by pressing a call button after inputting a device number). In some embodiments, an identifier may be associated with a user instead of a specific device. For example, a network may associate a particular device number or other identifier with a specific user, but that user may be able to receive communications through multiple devices. The network may then track which of those devices is associated with the user at any given time and may route communications to that device and/or to all devices associated with a given user at a given time.

In response to the user input of communication, such as a telephone call, chat rooms, and other messaging services, signaling message 203, communication terminal 101A transmits a call request communication at device call signaling message 204 to network interface device 111A. Network Interface Device 111A may forward the request at device call signaling message 205 to server 111B and server 111B may forward the request to communication terminal 101B at device call signaling message 206. FIG. 2 shows these and other communications going through network interface devices 111A and 111B instead of directly from communication terminal 101A to communication terminal 101B. In practice, communications between communication terminals 101A and 101B (or between terminals and other network elements) could pass through various intermediate elements of network(s) 109. In some cases an intermediate element may simply re-encapsulate and/or relay a communication, while in other cases an intermediate element may add or remove data or otherwise modify a communication before sending that communication to another element. As used herein, "communication" does not require that data be sent in a continuous stream. For example, data packets of a first communication could be intermingled with data packets of an unrelated second communication, with first communication packets identified and reassembled at a destination.

After receiving the communication signaling message 206, communication terminal 101B exchanges one or more signaling communications at device call signaling messages 207 and 208 with user B as part of an exchange. Communication terminal 101A, communication terminal 101B, network interface device 111A, network interface device 111B, and telecommunication network 112 may be configured to permit data exchange between (or with regard to) communication terminals 101A and 101B, but a voice call session is not established. During the signaling exchange, users A and B cannot speak with each other using communication terminals 101A and 101B. However, communication terminal 101A may output an audio signal through speaker 105A or other indicator that the recipient communication terminal is "ringing," and communication terminal 101B may provide an audio, visual and/or tactile (e.g., vibration) indicator of the received request for a voice call session.

Upon refusal or any other type of unavailability of user B to complete the voice call session, communication terminal 101B, sends a communication to communication terminal 101A via device call signaling messages 209, 210, and 211 indicating that the request for a voice call session is refused. Such communication to communication terminal 101A may be via (or may otherwise include) a text and/or video message, and/or may include other types of data that can be output (device call signaling message 212) to the user of communication terminal 101A (e.g., a pre-recorded voice and/or video message, a picture or other graphic, etc.). Upon receiving the communication of device call signaling message 211, communication terminal 101A recognizes that the recipient communication terminal (and/or its user) has refused the request for a voice call session. As a result, communication terminal 101A may then send a communication to server 111B via device call signaling messages 213 and 214 acknowledging receipt of the communication of refusal or any other type of unavailability and forwarding to the mail system of communication terminal 101B. In response, server 111B may recognize that communication terminal 101A understood the unavailability and forwarding communication and may be planning to leave a voice mail message.

Concurrent with the acknowledgement communication at call signaling message 214 or thereafter, network interface device 111A may be configured to send the voice, textual, and/or video message or other types of provisional messages to the server 111B as part of the voice mail message left with the mail system of user B. The voice mail message may include an audio signal that accompanies the voice, textual, and/or video message. For example, the audio and/or video message may be an audio and/or video signal of the user A stating, "Jim, I hope you can make the event." The voice, textual, and/or video message that accompanies this audio signal may include specific details of the event in question, such as where and when. User A may not want to leave a voice recording of such information in case the translation component of the called party's mail system misinterprets the audio message. In this manner, user A is assured that the voice, textual, and/or video message information will be accurately received by the user B when accessing his mail system.

At device call signaling message 215, user B may access his communication terminal 101B to gain access to his mail system at server 111B. A request to access the mail system is sent at device call signaling message 216. Network interface device 111B may decode the voice, textual, and/or video message from user A and send an audio and/or video signal representative of the voice message to communication terminal 101B at device call signaling message 217. The audio signal representative of the voice, textual, and/or video message may be outputted to user B at device call signaling message 218. In some embodiments, one or more of the operations performed by communication terminal 101A and/or 101B could be performed by a call server, such as network interface device 111A and/or 111B, or other element in telecommunication network 112 (see FIG. 1).

FIG. 3 is an exemplary communication diagram showing an audio, textual and/or video messaging or other types of provisional messaging feature according to at least some embodiments. As in the embodiments of FIG. 2, communication terminals 101A and 101B each may support the textual and/or video message feature. In the example of FIG. 3, user A inputs a textual and/or video message for a mail system of a called party device at device call signaling message 301. Device call signaling message 301 may occur prior to initiation of a request for a voice call session between user A and user B. At device call signaling message 301, user A may input the textual and/or video message that is pre-configured for sending to the called party. At device call signaling message 302, communication terminal 101A for user A sends the textual and/or video message to the network interface device 111A for user A where it may be stored. Concurrent with the textual and/or video message input at device call signaling message 301 or thereafter, user A may input an instruction to enable network interface device 111A to send the textual and/or video message, with an audio and/or video signal (e.g., a voice and/or video message from user A), to a mail system of a called party if a voice call session with the called party is refused. Similarly, concurrent with the textual and/or video message sent to the network interface device 111A at device call signaling message 303 or thereafter, communication terminal 101A may send an instruction to enable network interface device 111A to send the textual and/or video message, with an audio signal (e.g., a voice message from user A) or alone, to a mail system of the called party if a voice call session with the called party is refused. Alternatively, such features may be automatically enabled. The audio and/or video messages may be sent at the same time as the attempted call or at a time spaced from the attempted call. For example, if the communication terminal is busy and may only support one call (e.g., as on Verizon's network), then the communication terminal and/or network may be configured to store the audio and/or video text message and to deliver the message to the user once the call has ended and high speed signaling has resumed.

In the case where the message is textual only, the message may be sent using the out of band signaling channel normally associated with text messaging (e.g., the SS7 signaling channel). However, where the message is a video and/or audio message, typically these messages will not be accommodated through normally SS7 signaling. Accordingly, these messages may need to be stored until the called party terminates his or her phone session in order to initiate the transfer. Network interface devices 111A, 111B and/or telecommunication network 112 can determine whether or not first communication terminal is on a network that may only process one connection at a time. For example, where the first communication terminal is connect to an IP network through an 802.11 connection, it may be able to accept voice and/or video messages. However, where the first communication terminal 101A, 101B is connected to a wireless connection (e.g., 3G, 4G), the voice and/or video message may need to be stored by telecommunication system 112 until such time as the communication terminal 101A, 101B is able to accept the message.

At device call signaling message 303, user A of communication terminal 101A initiates a request for voice call session with user B. In the embodiment of FIG. 3, user A may do so by inputting an identifier (e.g., a telephone number) associated with communication terminal 101B and an instruction to begin the voice call session setup process (e.g., by pressing a call button after inputting a telephone number). In some embodiments, an identifier may be associated with a user instead of a specific device. For example, a network may associate a particular telephone number or other identifier with a specific user, but that user may be able to receive communications through multiple devices. The network may then track which of those devices is associated with the user at any given time and may route communications to that device or devices.

In response to the user input of call signaling message 303, communication terminal 101A may be configured to transmit a call request communication at device call signaling message 304 to network interface device 111A. Network Interface Device 111A may forward the request at device call signaling message 305 to server 111B and server 111B may forward the request to communication terminal 101B at device call signaling message 306. FIG. 3 shows these and other communications going through network interface devices 111A and 111B instead of directly from communication terminal 101A to communication terminal 101B. In practice, communications between communication terminals 101A and 101B (or between communication terminals and other network elements) could pass through various intermediate elements of telecommunication interface device 112. In some cases an intermediate element may simply re-encapsulate and/or relay a communication, while in other cases an intermediate element may add or remove data or otherwise modify a communication before sending that communication to another element.

After receiving the communication of device call signaling message 306, communication terminal 101B exchanges one or more signaling communications at device call signaling messages 307 and 308 with communication terminal 101B as part of a signaling exchange. Terminal 101A, communication terminal 101B, network interface device 111A, server 111B, and network(s) 109 are configured to permit data exchange between (or with regard to) communication terminals 101A and 101B, but a voice call session is not established. During the signaling exchange, users A and B cannot speak with each other using communication terminals 101A and 101B. However, communication terminal 101A may output an audio and/or video signal through speaker 105A and/or user interface 107A or other indicator that the recipient communication terminal is "ringing," and communication terminal 101B may provide an audio, visual and/or tactile (e.g., vibration) indicator of the received request for a voice call session.

Upon unavailability of user B to complete the voice call session, communication terminal 101B, sends a communication to communication terminal 101A via device call signaling messages 309, 310, and 311 indicating that the request for a voice call session is refused. Such communication to communication terminal 101A may be via (or may otherwise include) a text and/or video message, and/or may include other types of data that can be output (device call signaling message 312) to the user of communication terminal 101A (e.g., a pre-recorded voice message, a picture or other graphic, etc.). Upon receiving the communication of device call signaling message 311, communication terminal 101A recognizes that the recipient communication terminal (and/or its user) has refused the request for a voice call session. As a result, communication terminal 101A may then send a communication to server 111B via device call signaling messages 313 and 314 acknowledging receipt of the communication of unavailability and forwarding to the mail system of communication terminal 101B. In response, server 111B may recognize that communication terminal 101A understood the unavailability and forwarding communication and may be planning to leave a voice mail message.

Concurrent with the acknowledgement communication at device call signaling message 314 or thereafter, network interface device 111A may be configured to send the voice, textual, and/or video message to the server 111B as part of the voice mail message left with the mail system of user B. The voice mail message may include an audio and/or video signal that accompanies the voice, textual, and/or video message. At device call signaling message 315, server 111B may decode the voice, textual, and/or video message from user A and send the unmodified text of the voice, textual, and/or video message to communication terminal 101B at device call signaling message 316. In certain exemplary embodiments, the audio and/or video message may be displayed on the user interface 107B along with an overlay of the user's name and/or calling number. The unmodified text and/or video may be forwarded to the called party's communication terminal, such as communication terminal 101B, in a preferred manner of user B. For example, user B may request to receive unmodified text and/or video as an email message, as a text message, as both, and/or in some other manner. The communication received at device call signaling message 316 by communication terminal 101B may be outputted to user B at device call signaling message 317. In some embodiments, one or more of the operations performed by communication terminal 101A and/or 101B could be performed by a call server, such as network interface device 111A and/or 111B, or other element in telecommunication network 112 (see FIG. 1).

In exemplary embodiments, the call flow diagrams of FIGS. 2 and 3 may be variously implemented. In one embodiment, they may use datagram delivery protocol (DDP) to provide datagram delivery and routing service including carrying source and destination service socket numbers. In one exemplary embodiment, long format DDP is utilized including destination network number, node address and/or socket address. In still further embodiments, routing table maintenance protocol RTMP may be utilized to provide routing messages over suitable networks such as AppleTalk networks. In still further embodiments, split horizon routing protocols may be utilized. For example, the RTMP routing tables may include an indication of whether the device is enabled to receive text and/or video messages in its mail system. In alternate embodiments, the name binding protocol (NBP) may be utilized to provide an indication of whether the individual communication terminal 101A, 101B may be enabled to receive audio and/or video communications by associating the voice mail parameters with certain name lookup requests. In certain embodiments, the voice, textual, and/or video messages or other types of provisional messages may be sent encased in ATP and/or AppleTalk data stream protocol (ADSP) including a source ID, destination ID, send sequence number, receive sequence number, and/or window size. In still further embodiments, the video and/or audio files may be communicated using AppleTalk filing protocol (AFP) which enables transfer and file sharing between various communication terminals and/or device on telecommunication network 112.

Figure 4:
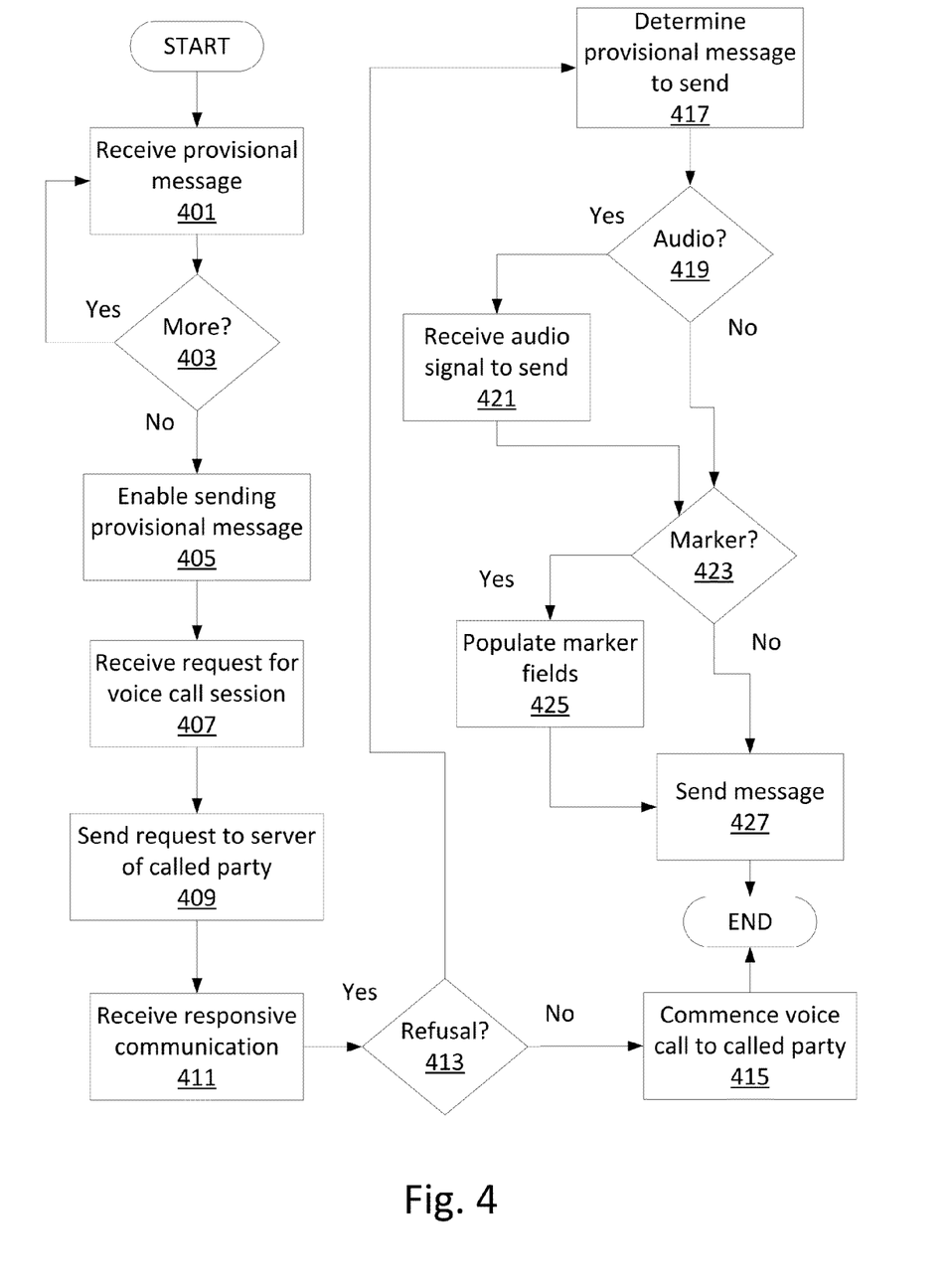
FIG. 4 illustrates an example process flow for implementing various features described herein.

FIG. 4 is a flow chart illustrating an exemplary process and showing operations performed by a server of a calling communication terminal that supports a voice, textual, and/or video message or other types of provisional message feature (e.g., server 101A) according to at least some embodiments. Although the operations shown in the process of FIG. 4 may be performed by a server as part of the communication sequences shown in FIGS. 2-3, the communication sequences of FIGS. 2-3 could also be performed by a server performing operations according to a process other than that reflected by FIG. 4. A person of ordinary skill will also appreciate that operations represented by certain steps of FIG. 4 could be performed by other devices, such as communication terminal 101A and/or communication terminal 101B.

At step 401, a computing device receives a voice, textual, and/or video message or other types of provisional message inputted by user. Such a voice, textual, and/or video message may be for a specific called party or may be for a group of individuals, one or more of which may be a called party. Such a voice, textual, and/or video message may be associated with profile date of the calling party. Such profile data may include a contacts listing or listing of favorite individuals in which to call. Such profile data may be maintained on a calling party's communication terminal, such as communication terminal 101A, at a network interface device 111A of the calling party, and/or within networked storage (e.g., cloud storage), such as within network 109, and or any other common storage location.

Different individuals may have different messages. Step 403 addresses multiple voice, textual, and/or video messages. In step 403, a determination may be made as to whether there are more voice, textual, and/or video messages received by the computing device. If an additional voice, textual, and/or video message is received, the process returns to step 401. If there are no additional voice, textual, and/or video messages received, the process moves to step 405.

In step 405, the computing device may receive an instruction to enable sending of a voice, textual, and/or video message to a called party's mail system if a signal is received that a request for a voice call session is proceeding to a voice mail of the called party. Such an instruction may be made by way of an interactive voice recognition based system, such as a calling party entering a pressing "1" to leave a first voice, textual, and/or video message (such as "Please call me back ASAP!) or pressing "2" to leave a second voice, textual, and/or video message (such as "Just checking in"). In other embodiments, the instruction to enable sending of a voice, textual, and/or video message may be by an on device call signaling message access from a calling party communication terminal. In exemplary embodiments, the called party rings busy, the calling party is presented with a series of icons for sending including voice, textual, and/or video precaned messages. These messages can be setup as part of the phone setup procedure. For example, a calling party communication terminal may input voice, textual, and/or video messages and/or enablement instructions for a computing device to be able to send voice, textual, and/or video messages to called parties through a website. A computing device, such as network interface device 111A, may access the voice, textual, and/or video message and/or enablement instructions per called party identifier and/or for one or more groups of called parties. Other manners for enabling a computing device to send one or more voice, textual, and/or video messages are also included herein.

Proceeding to step 407, the computing device receives user input indicating that a voice call session to a called party should be requested. After receiving that input, the computing device optionally may send a communication, to a server of the called party, requesting a voice call session with the called party at step 409. Subsequently, the computing device receives a communication in response to the voice call session request at step 411. The computing device then, at step 413, determines if the communication received in step 411 is an unavailability of the requested voice call session and if an indication of call forwarding to a mail system of the called party has been received. If not, the process continues to step 415 where the voice call session is commenced by connecting the called party to the calling party after which the process ends. In such a circumstance, no voice, textual, and/or video message is sent to the mail system of the called party.

If the computing device, at step 413, determines that the communication received in step 411 is an unavailability of the requested voice call session and that the call is being directed to the mail system of the called party, the process moves to step 417 where the computing device may determine the voice, textual, and/or video message to send to the mail system of the called party. The determination in 417 of the voice, textual, and/or video message to send may be just one voice, textual, and/or video message that was received by the calling device in step 401 or may be based upon a calling party identification of a selected voice, textual, and/or video message among a plurality of voice, textual, and/or video messages. For example, the determination in step 417 may be the computing device identifying the called party and referencing profile data of the calling party to see if the called party has a voice, textual, and/or video message to be sent in such circumstances. In such an example, the called party may be a child and there may always only be one voice, textual, and/or video message associated with that called party of "Please call me now." As such, the computing device can determine based on a single voice, textual, and/or video message for a called party.

In the example where there are multiple voice, textual, and/or video message that may be sent, the computing device may prompt a calling party to identify the particular voice, textual, and/or video message to be sent or may receive a selection of a desired voice, textual, and/or video message to be sent. For example, between steps 401 and 403 there may have been two voice, textual, and/or video messages received. The computing device may prompt the calling party with an option to select which voice, textual, and/or video message of the two voice, textual, and/or video messages to send to the mail system of the called party. In some embodiments, the calling party may press a numeric or alphanumeric input on her terminal device, such as communication terminal 101A. In other embodiments the voice, textual, and/or video message may include parameters for sending, such as send a first voice, textual, and/or video message if before noon or send a second voice, textual, and/or video message if noon or later in the day. In still other instances, the voice, textual, and/or video message may be determined based upon an area code of the called party, whether the called party is part of some group of called parties, such as individuals at work, friends, family, or clients, and/or based upon some other criteria, such as a history of calls reflecting the frequency of calls to that called party.

Proceeding to step 419, a determination may be made as to whether an audio signal is to accompany the voice, textual, and/or video message. For example, a prompt may be provided to a calling party to inquire as to whether the calling party wishes to leave an accompanying voice mail message for the called party. Such an example may be a case where the calling party wants to personalize a message with her voice while still including the voice, textual, and/or video message to ensure that the called party's mail system properly decodes the message for the called party. In such an example, the computing device receives the voice input audio signal from the calling party at step 421. If an audio signal is not to accompany the voice, textual, and/or video message at step 419, the process moves to step 423.

In step 423, a determination may be made as to whether a marker is included in the voice, textual, and/or video message. The marker may be a field for insertion of other data with the voice, textual, and/or video message. For example, the determined voice, textual, and/or video message from step 417 may recite:

Dear [MARKER], I hope that you can make my party on June $10^{th}$. See you then!

The marker may be the field shown above as [MARKER]. In such a case, the computing device may remove the marker and insert an appropriate entry into that area of the voice, textual, and/or video message. For example, the name of the called party may be inserted in the place of the marker. As such, the voice, textual, and/or video message for sending would then recite:

Dear Jim, I hope that you can make my party on June $10^{th}$. See you then!

Accordingly, a voice, textual, and/or video message that may be used for multiple called parties still may be personalized prior to sending to a particular called party.

If at least one marker is included in the voice, textual, and/or video message in step 417, the computing device populates the marker field(s) as needed at step 425 before proceeding to step 427. If no markers are included form step 423, the process moves to step 427. In still further embodiments, the message may relate to the user's predefined parameters such as work hours, entries on the calendar ("I am in a meeting") or other parameters that would allow for easy customization of the message.

In step 427, the voice, textual, and/or video message may be sent to the mail system of the called party. In the example of an audio signal accompanying the textual messaging, call origination information regarding the calling party may be sent with the voice, textual, and/or video message to allow for the audio signal from step 421 to accompany the voice, textual, and/or video message. The voice, textual, and/or video message may be sent from network interface device 111A to network interface 111B. Subsequently, a called party may access his mail system to receive the voice, textual, and/or video message in a preferred manner, such as via email, via text message, and/or in some other desired manner.

Figure 5:
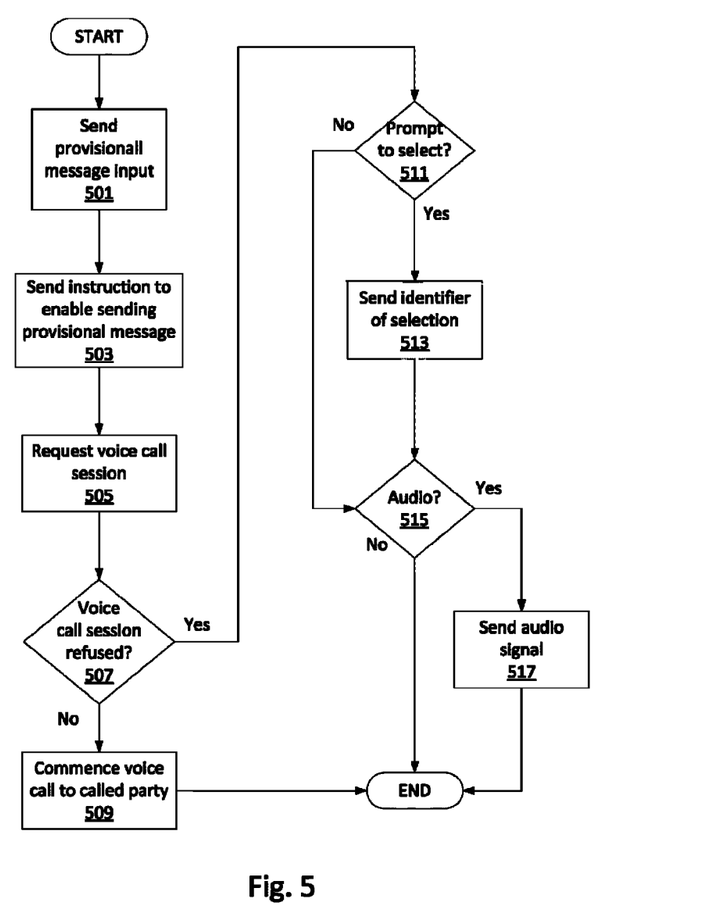
FIG. 5 illustrates an example process flow for implementing various features described herein.

FIG. 5 is a flow chart illustrating an exemplary process and showing operations performed by a calling party communication terminal that supports a voice, textual, and/or video message or other types of provisional message feature (e.g., communication terminal 101A) according to at least some embodiments. Although the operations shown in FIG. 5 may be performed by calling party communication terminal as part of the communication sequences shown in FIGS. 2-3, the communication sequences of FIGS. 2-3 could also be performed by a calling party communication terminal performing operations according to a process other than that reflected by FIG. 5. A person of ordinary skill will readily appreciate, however, that operations represented by certain steps of FIG. 5 could be performed by other devices, such as network interface devices 111A and/or 111B.

At step 501, a computing device sends a voice, textual, and/or video message or other types of provisional message inputted by user. Such a voice, textual, and/or video message may be for a specific called party or may be for a group of individuals, one or more of which may be a called party. Such a voice, textual, and/or video message may be associated with profile date of the calling party. Such profile data may include a contacts listing or listing of favorite individuals in which to call. Such profile data may be maintained on a calling party's terminal, such as communication terminal 101A, and/or at a network interface device 111A of the calling party. Different individuals may have different messages.

In step 503, the computing device may send an instruction to enable a server of the calling party computing device to send a voice, textual, and/or video message to a called party's mail system if a signal is received by the server that a request for a voice call session is proceeding to a voice mail of the called party. Such an instruction may be made by way of an interactive voice recognition based system, such as a calling party entering a pressing "1" to leave a first voice, textual, and/or video message (such as "Please call me back ASAP!") or pressing "2" to leave a second voice, textual, and/or video message (such as "Just checking in"). In other embodiments, the instruction to enable the server to send a voice, textual, and/or video message may be by an on device call signaling message access from a calling party computing device. For example, a calling party communication terminal may input voice, textual, and/or video messages and/or enablement instructions for a computing device to be able to send voice, textual, and/or video message to called parties through a website. A computing device, such as communication terminal 101A, may send the voice, textual, and/or video message and/or enablement instructions per called party identifier and/or for one or more groups of called parties. Other manners for enabling a server to send one or more voice, textual, and/or video messages are also included herein.

Proceeding to step 505, the computing device sends a request for a voice call session to a called party. Such a request may originate from a calling party in any of a number of different manners, including the calling party entering a telephone number into communication terminal 101A, whether by digit entry, by voice activation, and/or by selection from a list of contacts. The computing device then, at step 507, determines if the voice call session requested in step 505 is refused and if an indication of call forwarding to a mail system of the called party has been received. If not, the process continues to step 509 where the voice call session is commenced by connecting the called party to the calling party after which the process ends. In such a circumstance, no voice, textual, and/or video message is sent to the mail system of the called party.

If the computing device, at step 507, determines that the requested voice call session in step 505 is refused and that the call is being directed to the mail system of the called party, the process moves to step 511 where the computing device may determine whether a prompt is needed to determine the voice, textual, and/or video message to send to the mail system of the called party. Such an example may be the case where a calling party desires to select between a plurality of voice, textual, and/or video messages to send. If there is no need to provide a prompt, such as the case where there is only one voice, textual, and/or video message to be sent, the process moves to step 515. If a prompt is needed in step 511, the process moves to step 513 where the computing device sends an identifier of the selected voice, textual, and/or video message to a server, such as network interface device 111A. One example may be an interactive voice recognition system where a user is prompted to choose between one of multiple options and to enter a selected voice, textual, and/or video message on an input component of the computing device, such as the numeric "1" on a keypad of communication terminal 101A. Following step 513, the process moves to step 515.

Proceeding to step 515, a determination may be made as to whether an audio signal is to accompany the voice, textual, and/or video message. For example, a prompt may be provided to a calling party to inquire as to whether the calling party wishes to leave an accompanying voice mail message for the called party. In such an example where an audio signal is desired, the computing device receives the voice input audio signal from the calling party and sends it to the server, such as network interface device 111A, at step 517 before the process ends. If an audio signal is not to accompany the voice, textual, and/or video message at step 515, the process ends. Subsequently, the server for the calling party, such as network interface device 111A for communication terminal 101A, sends the voice, textual, and/or video message to the mail system of the called party. Such as example for operation of the network interface device 111A is illustratively shown in FIG. 4.

In at least some embodiments, and as described above, certain communications can be sent during a signaling exchange when a voice call session has not been established. In some embodiments one or more other messages can be sent without establishing the voice call session requested by the calling party communication terminal. For example, a communication refusing the requested voice call session could include a tone and/or voice recording played through the speaker of the calling party communication terminal. Similarly, a communication indicating that the called party communication terminal supports the text messaging feature could include a tone or voice recording, played through the calling party communication terminal speaker, indicating such.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
receiving, from a calling party device, a first provisional message for a mail system of a called party device;
receiving a second provisional message for the mail system of the called party device;
sending a first communication requesting a voice call session with the called party device;
receiving a second communication comprising an indication of an unavailability of the requested voice call session and an indication of forwarding to the mail system of the called party device; and
determining, responsive to the second communication, whether to send the first provisional message with call origination information enabling an audio signal to accompany the first provisional message or the second provisional message to the mail system of the called party device.

2. The method of claim 1, further comprising receiving an instruction to enable sending one of the first provisional message and the second provisional message to the mail system of the called party device.

3. The method of claim 2, wherein receiving the instruction to enable sending one of the first provisional message and the second provisional message to the mail system of the called party device further comprises receiving the instruction by an online access from the calling party device.

4. The method of claim 2, wherein receiving the instruction to enable sending one of the first provisional message and the second provisional message to the mail system of the called party device further comprises receiving the instruction by interactive voice recognition from the calling party device.

5. The method of claim 1, wherein the first provisional message is a textual message that comprises a marker for insertion of a name of the called party.

6. The method of claim 1, wherein the first provisional message for the mail system of the called party device is for a group of called party devices.

7. The method of claim 1, further comprising receiving an instruction from the calling party device to enable sending the second provisional message to the mail system of the called party device.

8. The method of claim 1, further comprising responsive to receiving the second communication, providing an option to the calling party device to select the first provisional message from one or more provisional messages for sending to the mail system of the called party device.

9. The method of claim 8, further comprising:
receiving a reply representative of selecting the first provisional message; and
sending the selected first provisional message.

10. The method of claim 8, wherein the providing the option to select the first provisional message from the one or more provisional messages further comprises providing a series of icons.

11. The method of claim 1, further comprising sending one of the first provisional message and the second provisional message to the mail system of the called party device responsive to the second communication.

12. A method comprising:
prior to requesting a voice call session with a called party device, receiving, from a calling party device, at least one provisional message for a mail system of the called party device; and
sending a first communication requesting the voice call session with the called party device;
determining whether the requested voice call session is refused;
if the voice call session is refused, sending the at least one provisional message with call origination information enabling an audio signal to accompany the at least one provisional message to the mail system of the called party device; and
if the voice call session is not refused, completing the requested calling party device to the called party device without sending the at least one provisional message.

13. The method of claim 12, wherein the at least one provisional message is a textual message and wherein the textual message for the mail system of the called party device is for a group of called party devices.

14. The method of claim 12, further comprising providing, to the calling party device, an option to select the at least one provisional message from one or more provisional messages for sending to the mail system of the called party device.

15. The method of claim 14, further comprising:
receiving a reply representative of selecting the at least one provisional message; and
if the voice call session is refused, sending the selected at least one provisional message.

16. A method comprising:
receiving, from a calling party device, a plurality of provisional messages for a mail system of a called party device;
sending a first communication requesting a voice call session with the called party device;
receiving a second communication comprising an indication of an unavailability of the requested voice call session and an indication of forwarding to the mail system of the called party device;
responsive to receiving the second communication, providing an option to the calling party device to select at least one provisional message from the plurality of provisional messages for sending to the mail system of the called party device; and
sending the at least one provisional message with call origination information enabling an audio signal to accompany the at least one provisional message to the mail system of the called party device responsive to the second communication.

17. The method of claim 16, further comprising receiving a reply representative of a selected provisional message, wherein sending the at least one provisional message further comprises sending the selected provisional message.

18. The method of claim 16, further comprising receiving an instruction to enable sending the at least one provisional message to the mail system of the called party device.

19. The method of claim 18, wherein receiving the instruction to enable sending the at least one provisional message to the mail system of the called party device further comprises receiving the instruction by an online access from the calling party device.

20. The method of claim 18, wherein receiving the instruction to enable sending the at least one provisional message to the mail system of the called party device further comprises receiving the instruction by interactive voice recognition from the calling party device.

* * * * *